Jan. 9, 1940.  L. HOPP  2,186,698
PRICE TICKET PROTECTOR
Filed April 6, 1939
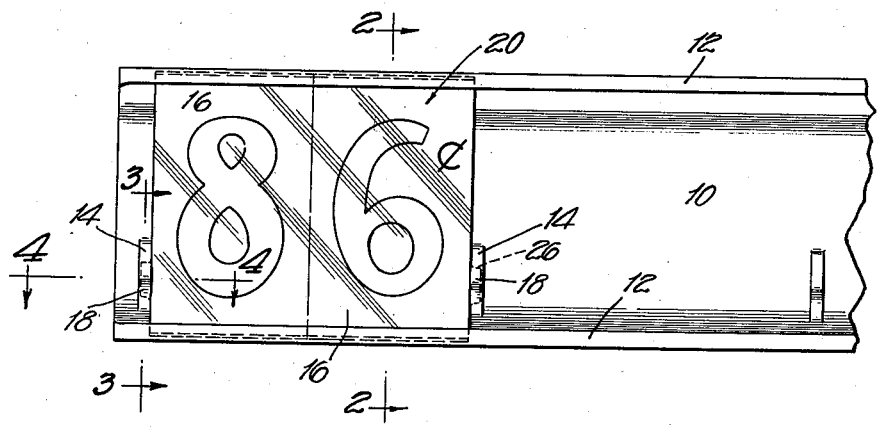
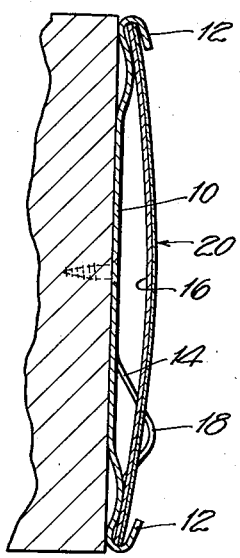
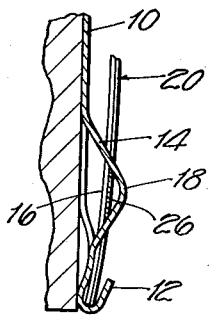
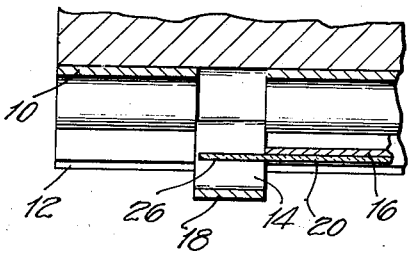
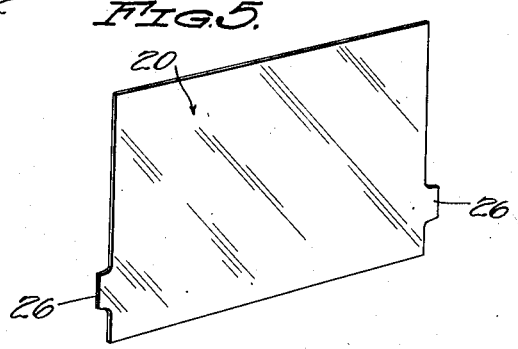
LEO HOPP.
INVENTOR
BY *Ely Gattisoy*
ATTORNEYS
WITNESS:

Patented Jan. 9, 1940

2,186,698

UNITED STATES PATENT OFFICE 2,186,698

PRICE TICKET PROTECTOR

Leo Hopp, New York, N. Y.

Application April 6, 1939, Serial No. 266,342

2 Claims. (Cl. 40—17)

This invention relates generally to price ticket holders and more particularly it pertains to a protector for rendering more difficult, the removal or shifting of price tickets relatively to one another in a holder in which they may be mounted.

In the accompanying drawing, I have illustrated my invention in combination with a price ticket holder of the channel or molding type but, as will become apparent, it is not necessarily limited to this type of holder.

In modern stores, the goods is displayed upon shelves or counters and the prices are displayed by means of interchangeable price tickets carried in suitable holders.

As is the case where the goods are displayed upon counters, tables or the like and in many cases where the goods is displayed upon shelves, both the goods and the price markers are readily accessible to the customer who in many instances merely helps himself to the goods thus waiting upon himself.

The accessibility of the price markers, together with the ease in which they may be so readily removed from their holders or carriers, tempts many unscrupulous persons to shift the relative positions of the price tickets in order to display a lower unit price for the goods with which the price tickets are associated and then insist upon purchasing the goods at the lower unit price.

It is the object of the present invention to provide a protector for the price tickets of price markers which, although it neither prevents the removal nor shifting of the relative positions of the price tickets, renders such a task more difficult and thus discourages the above recited surreptitious practice.

The invention consists of a transparent member which is adapted to overlie the price tickets in display position in a price ticket holder together with means for holding the transparent member in position relatively to the price tickets and their holder in such a manner that while the price tickets may be readily shifted or removed from the holder, removal of the transparent member from the price ticket holder is a more difficult proposition.

The invention will be readily understood from the following specification and claims considered together with the accompanying drawing, in which:

Figure 1 is a fragmentary view in elevation illustrating a price ticket holder and price tickets with a guard constructed in accordance with the present invention, Figure 2 is an enlarged transverse sectional view taken substantially on the line 2—2 of Figure 1, Figure 3 is a detail sectional view on an enlarged scale taken substantially on the line 3—3 of Figure 1, Figure 4 is a detail sectional view taken substantially on the line 4—4 of Figure 1, and;

Figure 5 is a perspective view of the guard member.

In the accompanying drawing I have illustrated a price ticket holder in the form of a channel member or molding of the general type illustrated in my prior Patent No. 2,046,121, issued June 30, 1936 to which the present invention particularly lends itself.

A ticket holder constructed in accordance with my prior patent, above mentioned, consists of a main elongated body portion 10 which is preferably flat. Extending longitudinally of each side edge of the body portion 10, there is a price ticket retaining flange 12 which extends inwardly of the body portion, overlying the same in spaced relation therewith. Looped lugs 14 are provided at spaced intervals along the body portion between which the price tickets 16 are positioned, the lugs serving to prevent accidental movement of the tickets longitudinally of the holder.

The price tickets are retained in position by engagement of two of their edges behind the flanges 12 as shown in Figure 2 and by further reference to said figure, it will be apparent that the looped portion 18 of the lugs 14 projects beyond the plane of the price ticket 16.

When two or more price tickets 16 are employed as illustrated in Figure 1 to display a unit price, the tickets, as ordinarily displayed, may be relatively shifted to change the value of the unit price. For example, should the tickets shown in Figure 1 be transposed, the unit price would then read sixty-eight (68¢) cents.

In accordance with the present invention, to render tampering with the tickets more difficult, I provide a guard such as illustrated in Figure 5.

The guard comprises a sheet of semi-rigid transparent material, such as designated 20 in the drawing. The guard is of such shape and size as to fit between the looped portions 18 of the lugs 14 and also have two of its edges received behind the ticket retaining flanges 12.

Projecting from each side edge of the body of the guard at a point near the lower edge thereof, there is a tab or ear 26. These tabs or ears 26 are of such a size and so related with respect to the body portion of the guard that when the guard is placed in position in the price ticket holder, the tabs or ears 26 will be received in the looped portions 18 of their respective lugs 14. This engagement of the tabs or ears 26 behind the lugs 14 serves to retain the guard member 20 in place in the holder in overlying relation with the price tickets 16, thus preventing access thereto without removal of the guard member.

The guard member 20 is placed in position in the price ticket holder simply by flexing of the guard sufficiently to permit of insertion of the tabs or ears 26 within the loops 18 of the lugs 14. Although, as before stated, the guard member 20 is formed from material of a semi-stiff or rigid material, when the guard is held in both hands, it is not a difficult task to flex the guard sufficiently to position it in the price ticket holder. However, removal of the guard from the price ticket holder becomes a more difficult operation particularly to one unfamiliar with the operation. This is mainly because the guard, lying substantially flat, with two of its edges positioned behind the ticket retaining flanges 12 and its tabs or ears 26 behind the lugs 14, flexing of the guard to remove it, unless the problem is understood, is really an awkward operation and unless properly performed, often results in damage to the guard.

The guard can, however, be removed with facility if it be first flexed transversely, that is longitudinally of the holder 10 to disengage its upper edge from behind the upper ticket retaining flange. If now, the guard be flexed in the opposite direction, the tabs or ears will become disengaged with their respective lugs and permit of the lower edge of the guard passing clear of the lower ticket retaining flange 12.

From the foregoing it will be apparent that the present invention provides a guard for price tickets which will at least render unauthorized or surreptitious manipulation of the tickets a task of such proportions as to discourage and thereby practically eliminate such practice.

Having thus described the invention, what is claimed, is:

1. In combination with a price ticket holder having ticket positioning means in the form of spaced looped lugs, a price ticket protector, said protector comprising a transparent member adapted to overlie a price ticket mounted in the holder, and tabs projecting from the side edges of the transparent member for engagement behind the looped lugs to retain the transparent member in position with relation to the price ticket and the price ticket holder.

2. In combination with a price ticket channel including a main body portion, ticket retaining flanges and looped lugs extending inwardly from the body portion of said channel, a price ticket protector comprising a sheet of transparent material adapted for reception within said price ticket channel with two of its edges behind the said ticket retaining flanges and a tab projecting from each of opposite sides of the transparent sheet for engagement with the looped lugs to secure the transparent sheet in position in the price ticket holder.

LEO HOPP.